(12) United States Patent
Clapp et al.

(10) Patent No.: US 12,368,406 B2
(45) Date of Patent: Jul. 22, 2025

(54) MULTI-MODE SECURITY STATE SYSTEM

(71) Applicant: Community Adaptation, LLC, Red Lodge, MT (US)

(72) Inventors: Walter D. Clapp, Red Lodge, MT (US); Donald H. Clapp, El Campo, TX (US); Robert Y. Seward, Fort Collins, CO (US)

(73) Assignee: COMMUNITY ADAPTATION, LLC, Red Lodge, MT (US)

( * ) Notice: Subject to any disclaimer, the term of this patent is extended or adjusted under 35 U.S.C. 154(b) by 319 days.

(21) Appl. No.: 17/850,307

(22) Filed: Jun. 27, 2022

(65) Prior Publication Data

US 2023/0071887 A1 Mar. 9, 2023

Related U.S. Application Data

(63) Continuation of application No. 17/017,309, filed on Sep. 10, 2020, now Pat. No. 11,437,948.

(60) Provisional application No. 62/899,143, filed on Sep. 11, 2019.

(51) Int. Cl.
| | |
|---|---|
| *H02S 20/30* | (2014.01) |
| *H02S 30/10* | (2014.01) |
| *H02S 30/20* | (2014.01) |
| *H02S 40/30* | (2014.01) |
| *H02S 40/32* | (2014.01) |
| *H02S 40/34* | (2014.01) |
| *H02S 40/38* | (2014.01) |

(52) U.S. Cl.
CPC .............. *H02S 20/30* (2014.12); *H02S 30/10* (2014.12); *H02S 30/20* (2014.12); *H02S 40/30* (2014.12); *H02S 40/32* (2014.12); *H02S 40/34* (2014.12); *H02S 40/38* (2014.12)

(58) Field of Classification Search
CPC .......... H02S 20/30; H02S 30/10; H02S 30/20; H02S 40/30; H02S 40/32; H02S 40/34; H02S 40/38; H02S 10/40
See application file for complete search history.

(56) References Cited

U.S. PATENT DOCUMENTS

| | | | |
|---|---|---|---|
| 6,932,564 B2 | 8/2005 | Davis | |
| 8,695,679 B2* | 4/2014 | Boast | C12M 41/34 |
| | | | 160/90 |
| 10,379,582 B2 | 8/2019 | Davis et al. | |
| 2006/0174102 A1* | 8/2006 | Smith | H04W 12/0471 |
| | | | 713/150 |
| 2006/0260672 A1 | 11/2006 | Niederer | |
| 2007/0009346 A1 | 1/2007 | Davis | |

(Continued)

FOREIGN PATENT DOCUMENTS

| | | |
|---|---|---|
| CN | 207460144 U | 6/2018 |
| RU | 2647984 C2 | 3/2018 |

*Primary Examiner* — Khoi V Le
(74) *Attorney, Agent, or Firm* — Vorys, Sater, Seymour and Pease LLP

(57) ABSTRACT

The present disclosure relates to apparatus and methods for generating solar power. In some examples, a solar unit can have multiple solar panels (and one or more non-solar panels), a set of hinges, and air driven cooling. The unit can be configured to couple the plurality of panels to one another in a geometric shape. In an example, a set of hinges can include at least one rotatable hinge that can be coupled to at least one respective rotatable solar panel of the plurality of solar panels.

16 Claims, 11 Drawing Sheets

(56) References Cited

U.S. PATENT DOCUMENTS

| | | |
|---|---|---|
| 2007/0029498 A1 | 2/2007 | Davis |
| 2007/0029952 A1 | 2/2007 | Davis |
| 2007/0107768 A1 | 5/2007 | Romana et al. |
| 2008/0196758 A1 | 8/2008 | McGuire |
| 2010/0096016 A1 | 4/2010 | Davis |
| 2011/0049992 A1 | 3/2011 | Sant'Anselmo et al. |
| 2011/0204720 A1 | 8/2011 | Ruiz et al. |
| 2012/0025750 A1 | 2/2012 | Margo |
| 2012/0293111 A1 | 11/2012 | Sentinelli et al. |
| 2014/0040979 A1* | 2/2014 | Barton ................. H04W 12/30 726/1 |
| 2014/0230882 A1 | 8/2014 | Hingley |
| 2014/0285005 A1 | 9/2014 | Casteel |
| 2014/0307384 A1 | 10/2014 | Best |
| 2014/0338720 A1 | 11/2014 | Caster et al. |
| 2015/0271184 A1* | 9/2015 | Josang ................ H04W 12/086 726/22 |
| 2016/0157075 A1 | 6/2016 | Ho |
| 2017/0067271 A1* | 3/2017 | Schroeder ................ E05C 3/24 |
| 2018/0083570 A1 | 3/2018 | Sella et al. |
| 2018/0175629 A1 | 6/2018 | Andrei |
| 2018/0366789 A1 | 12/2018 | Petrella |
| 2019/0331365 A1 | 10/2019 | Davis |
| 2020/0106383 A1 | 4/2020 | Retti et al. |
| 2020/0106384 A1 | 4/2020 | Postiglione et al. |

\* cited by examiner

MULTI-MODE SECURITY STATE SYSTEM

CROSS-REFERENCE TO RELATED APPLICATIONS

This application is a Continuation of U.S. patent application Ser. No. 17/017,309, filed Sep. 10, 2020, now U.S. Pat. No. 11,437,948, and entitled "MODULAR SUSTAINABLE POWER GENERATION UNIT," which claims the benefit of priority from U.S. Provisional Patent Application No. 62/899,143, filed on Sep. 11, 2019. The entire contents of each of the above-identified patent applications are incorporated herein by reference in its entirety.

TECHNICAL FIELD

The field relates to power generation, data protection, mobility, and survivability.

BACKGROUND

Electrical power generation and transmission is increasingly needed in a variety of applications. Power is used in commercial, residential and other applications to drive electronic devices, power buildings, homes and electrical vehicles, and operate computer data networks. In many applications it is imperative for power sources to be reliable and redundant.

A number of threats to reliable power generation, conversion, and transmission have emerged. These threats may include cyber-, physical-, and EMP-attacks to a power grid, natural disasters, space weather, pandemics, and disruptive weather events from climate change, such as, flooding, storm surge, or wind. Increasingly it is desired that power generation be more resilient to external events and other disruptions, and run without large numbers of human maintenance workers. Many power sources however are centralized, enormous, and installed in fixed locations—which makes them vulnerable to threats, and not resilient when workers cannot centralize. Many power sources, such as stand-alone generators, often are a separate closed unit that are unable to scale to meet higher demands or needs.

Limited efforts have been put forward to increase the resiliency of power supplies with the use of solar power and with the development of modular, transportable power generator systems. Even fewer have linked this resilient and mobile power supply to Web 3.0 and a novel hardware/software interface for communication capabilities.

Russian patent RU264794 describes a modular mobile solar generator. Paragraph 00111 describes "[i]n another embodiment, several mobile SMG solar generator 5 may be combined or connected in series or in parallel to increase the overall power system. Various combinations of movable SMG solar generator 5 are provided for adding to the local power grid or creating localized network."

United States Published Patent Application No 20180175629A1 describes a Mobile Disaster Survival System with a standalone survival package. The abstract describes a "survival package containing three or more electrical power sources, food and water for four people for five days, a potable water purification and storage means, a means for food storage and preparation, an emergency broadcast radio set, and immediately accessible survival tools, as well as first aid and other equipment. Energy storage devices and sensitive electronic equipment are protected by hydrogen vent fans and Faraday cages. The small footprint allows the system to be pre-located at individual homes or businesses, or rapidly deployed from distribution centers by either manpower, automobile, en masse by semitrailer, or by an airdrop system. The unique advantage of the present invention is the combination of all aspects of emergency survival needs in a compact transportable system."

United States Published Patent Application No 20110049992A1 is entitled systems, methods, and devices including modular, fixed and transportable structures incorporating solar and wind generation technologies for production of electricity. Folding panels are in a transportable cube configuration. See, for example, FIGS. 31, 43, 44F, 46, 128.

United States Published Patent Application No 20160157075A1, entitled EMP-Shielded, Power-Independent SMS Text Tower System For Nuclear Communications, includes inter alia a Faraday cage. See, e.g., Abstract and FIG. 1, Faraday cage [0067].

United States Published Patent Application No 20080196758A1 entitled Portable, self-sustaining power station, includes a station that "may be moved by land, air, or sea to an area that has no utilities." See, e.g., Abstract and FIG. 3A.

United States Published Patent Application No 20110204720A1 entitled Efficient usage, storage, and sharing of energy in buildings, vehicles, and equipment describe inter alia modularity of battery packs and systems. See e.g. FIG. 11.

United States Published Patent Application No 20140230882A1 entitled Mobile power system describes inter alia EMP protection. See, e.g., paragraph [0106].

Lastly, Chinese patent CN2074601144 (U) entitled, Relief of disaster emergency communication terminal, describe inter alia a portable wheel case. See, e.g., FIG. 1.

What is needed is improved methods and systems for providing resilient, scalable, and sustainable power generation.

BRIEF SUMMARY

Apparatus and methods for generating solar power are disclosed in embodiments of the present invention.

In an embodiment, a solar unit has multiple solar panels (and one or more non-solar panels), a set of hinges, and air driven cooling. The unit can be configured to couple the plurality of panels to one another in a geometric shape. In one example, a set of hinges includes at least one rotatable hinge coupled to at least one respective rotatable solar panel of the plurality of solar panels.

In one embodiment, at least one rotatable hinge is configured to allow respective rotatable solar panels to move between open, partial open and closed configurations of the solar unit. For a closed configuration, each rotatable hinge holds each respective rotatable solar panel relative to one another in the approximate geometric shape. For a partial open configuration, at least one rotatable hinge holds a respective rotatable solar panel partially open at an acute angle relative to the approximate geometric shape. For an open configuration, at least one rotatable hinge holds a respective rotatable solar panel open at a right angle or greater than a right angle relative to the approximate geometric shape.

In one embodiment, a switch controls when a respective rotatable solar panel is positioned according to open, partial open or closed configurations of the solar unit. A selector switch has multiple switch positions corresponding to different security modes. Each security mode corresponds to a different level of access to solar cube unit hardware, Faraday protection, and communications access. In one example, the selector switch may be moved between six selector switch positions P0-P5 corresponding to five different security modes. A moveable support member may be coupled to the selector switch. In response to a switch position of the selector switch, the support member selectively engages one or more of a battery, transceiver, processor, memory, and storage memory to set a particular security mode. The moveable support member may include one or more contact arms that have respective contacts that selectively engage different portions a battery, transceiver, processor, memory, and storage memory to set a particular security mode.

In a further embodiment, a set of hinges comprises a set of removeable rods and a set of sleeves for receiving the removeable rods. In an example, the set of sleeves comprise sleeves configured to be coupled to sides of the plurality of solar panels. Removable rods are inserted into the sleeves of adjacent solar panels to hold the respective adjacent solar panels relative to one another. In a further example, a set of end couplers are positioned to hold one or more removable rods in place within sleeves of adjacent solar panels.

In one example, electronics are positioned within a solar unit. The electronics are positioned within the approximate geometric shape formed by the plurality of solar panels. In an embodiment, the electronics are protected and electro-magnetically shielded. A controller controls a security state of the solar unit that varies depending on whether the solar unit is in an open, partial open or closed configuration. In one feature, the security state includes the type of external communication permitted and the level of access permitted to computer-readable memory within the solar unit.

In an embodiment, the electronics in a solar unit includes a rechargeable battery coupled to each solar panel and a charge controller coupled to the between each solar panel and the battery. The electronics may further include a computer-readable memory, a processor, and a user-interface. A wireless transmitter or receiver may also be provided.

In an embodiment, the solar unit is cooled via air during transported, or while mounted to a utility scale wind farm. In another embodiment, one skateboard can cool two units using its one low pressure fan.

In further embodiment, a solar unit is modular and may be coupled to other solar cube units to form a grid or collection of solar units. Multiple solar units may be arranged in a row, grid, stack, or cluster. In one embodiment, a set of hinges are further configured to couple one or more solar units to one another. Each modular solar unit may include a rechargeable battery coupled to a respective plurality of solar panels and to a respective output port. Charge stored in the rechargeable batteries may be output from the sustainable power grid through the output ports.

In another feature, mobility may be provided. A skate assembly has one or more wheels or tracks supporting a set of solar panels and hinges via frame mounted motors. In another example, a skateboard assembly has one or more wheels or tracks for supporting the set of solar panels and hinges to move relative to ground.

In a further embodiment, a solar unit may be configured for use as furniture such as a coffee table. In another embodiment, a solar unit may be configured as a wheelchair transport unit. For example, a rotatable hinge is coupled to a respective rotatable solar panel such that in an open configuration the respective rotatable solar panel forms at least a seat back of a mobile chair.

In a further embodiment, all protrusions through Faraday protection will be made of diamond or diamond composite materials.

In embodiments, a solar unit may have a geometric shape that may include but is not limited to a rectangular, pyramid, or other shape. A rectangular shape may include a rectangular shape of the same or different lengths, heights, and widths, and may be but is not limited to a cubic shape. A geometric shape may also be but is not limited to a shape divisible into a shape (and size) which can legally be transported on roadways or by air or ship.

Further embodiments, features, and advantages of the invention, as well as the structure and operation of the various embodiments of the invention are described in detail below with reference to accompanying drawings.

BRIEF DESCRIPTION OF THE DRAWINGS

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1A:
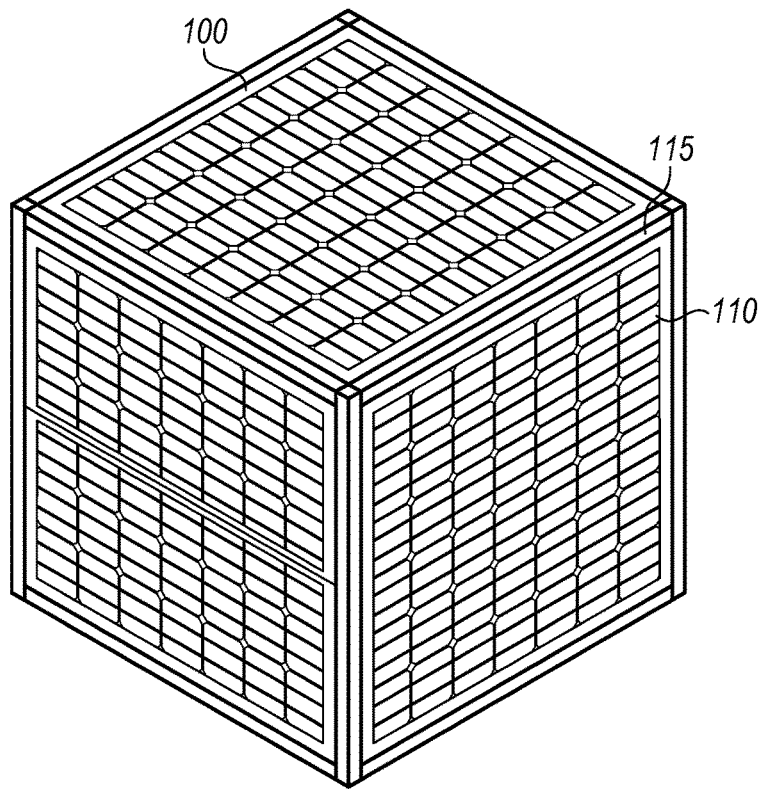
FIG. 1A is a perspective view of a solar cube unit in a closed configuration according to an embodiment of the present invention.

New apparatus and methods for generating, storing, and transporting solar power and data are disclosed in embodiments of the present invention. Unique solar units are described that can be arranged in modular, scalable and transportable configurations. A solar unit having solar panels and hinges is described. A solar unit is described that can open and close in different configurations. Solar units are described which can provide secure, mobile power generation in the event of disaster, emergency, wireless communication (5G), or other need. Solar cube units that can be coupled to skateboard transport units are also described. Collections of solar cube units in a tiny city and in a tracked vehicle or variable trailers are described. Further, a solar unit that operates as a wheelchair transport vehicle is described.

In one feature, systems for providing resilient, scalable, and sustainable power generation including solar cube units may be wed to resilient data infrastructure coordinated scales. In one example, a system may scale within ubiquitous 40 foot shipping containers and be a foundation of next-generation World Wide Web products, Web 3.0.

In an embodiment, a solar cube unit has multiple solar panels (and one or more non-solar panels such as a panel or panel with a vent), a set of hinges, and air driven cooling. For example, air-driven cooling may be provided by a cooling system including, but not limited to, a systems for cooling using a microchannel such as described in U.S. Pat. Nos. 6,932,564, 10,379,582, 20070009346A1, 20070029498A1, 20070029952A1, 20100096016A1, 201130153182A1, 20190331365A1 (each of which is incorporated by reference herein). The unit can be configured to couple the plurality of panels to one another in a geometric shape perfectly divisible into a size and shape which can legally be transported on roadways in a country. Such a geometric shape may include but is not limited to a rectangular, pyramid, or other shape.

In an embodiment, a solar unit (or collection of solar units) may be a modern tiny home. It is also the smallest low voltage DC microgrid, given the average size of a human, and is a new kind of protected slow internet in an emergency or other event. In this way, solar units can serve as building blocks of a direct current (DC) microgrid system. It is the building block for sustainable solar survival. Different sizes may be used. In one example, a solar cube unit may be 24"×24"×24"—so likely more narrow than average American Disabilities Act (ADA) accessible doorway. A strong locking solar cube unit may contain a battery, a DC motor, a heated bedroll, a solar panel, computing capability, and hard drive space for storage for an abridged copy of the internet. Essential electronics can be contained in a Faraday cage that wraps the interior of the cube or an approximate Faraday cage made up of panels and panel couplers (such as rod hinges).

In a skate configuration, tires of the skate can connect or disconnect from a DC motor (or alternator). When connected and the device is pulled behind a car, bike, walking human, horse, or other, it generates electricity. It can be disconnected when riding up hills and reconnected when riding down for gravitational recovery of energy. A DC motor can drive the wheels or other attachments.

The DC motor has two slots for rods to be placed into the motor. They are non conductive and designed to maintain the Faraday cage. Attachments can be placed into drive shafts for connecting to tires or human hands, etc.

For instance, a person can attach two opposed pedals to the motor, one on either side of the solar cube unit. The pedals ban be driven by hand, foot, water, or wind depending on at least three configurations of the "petals."

The solar unit is designed to integrate with other units for information sharing. For instance, the solar unit connects to the grid and to the internet when depositing/withdrawing electricity and/or data. But, otherwise a solar unit may spend a majority of its time isolated from the U.S. Electric grid and the Global Internet for further security, providing portions of a unit that have never connected to the internet. Hence, the solar cube unit can provide the blueprints to recreate society that is not dependent on centralized power or cyberinfrastructure. It is a library that the greatest Roman cathedrals could never hold. And it is EMP Proof. And it is portable.

A solar unit may also include a leashed non-lethal stun gun. A solar unit can include 360 degree video camera or other camera and a five 5 min looping prerecord or other message. Any video triggered by a tazing event can only be obtained by warrant, as the unit is one's home. The same for any other search of the cube unit.

The solar unit may contain an integrated water filter that can fill bottles or be used as a portable bidet when pump is used in reverse.

The solar unit may also be fitted to carry some water, jet fuel, an AED, additional lighting, refrigeration, and hub administration technology.

In one feature, solar units are most efficient when approximately 150 are hooked together. When 150 units are selectively linked together, the units may form a hub interconnection. This hub interconnection may also be connected with other hubs of 150 cubes. The hubs may distribute, transmit, and generate power as a utility or for output to an existing or third-party utility at the hub location. The number 150 is illustrative and other numbers of units may be interconnected in a hub.

A solar unit owner from each hub may be provided free online and in-person training to become a master mechanic of a solar unit.

When 150 solar units are linked together, they may be parked/stored on flat roofs. They can lock together to create shielding for actual roof, providing benefit to roof owner.

The hubs can also be paired in series and/or parallel to power larger and larger pieces of electric equipment such as a water treatment facility or mill.

There can be a seat attachment to a solar unit for personal transportation.

Embodiments refer to illustrations described herein with reference to particular applications. It should be understood that the invention is not limited to the embodiments. Those skilled in the art with access to the teachings provided herein will recognize additional modifications, applications, and embodiments within the scope thereof and additional fields in which the embodiments would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1B:
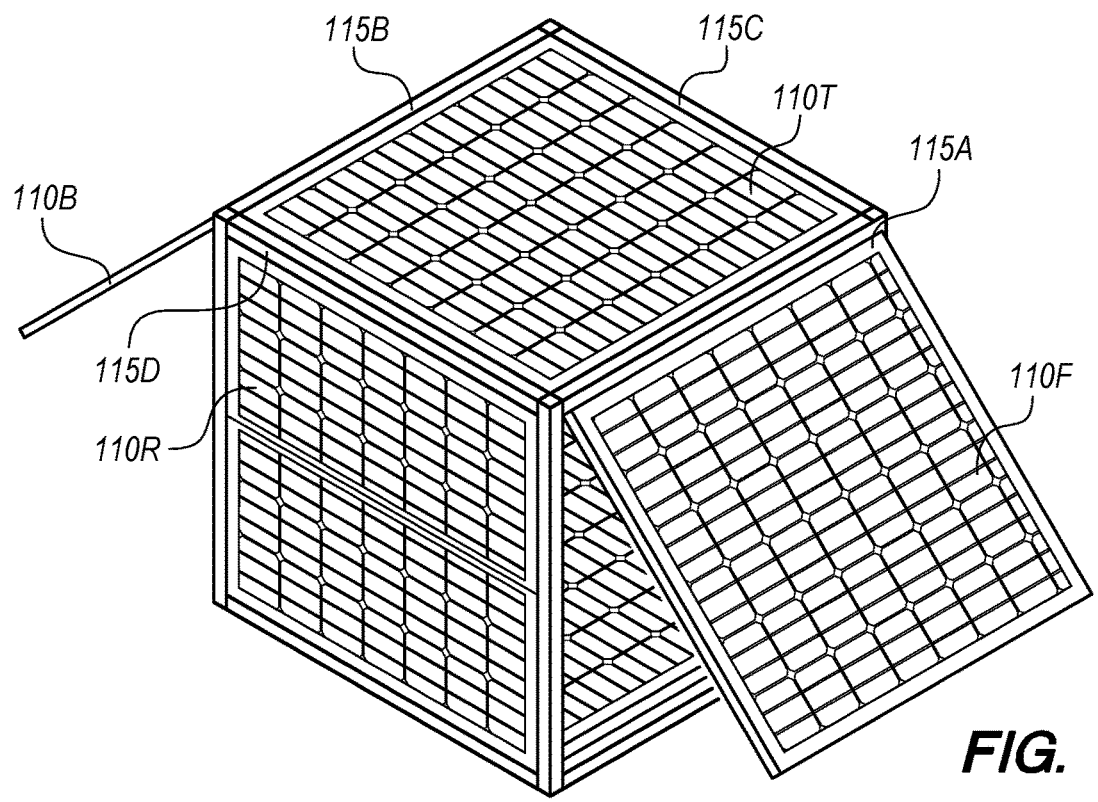
FIG. 1B is a perspective view of a solar cube unit in a partially open configuration according to an embodiment of the present invention.
Figure 1C:
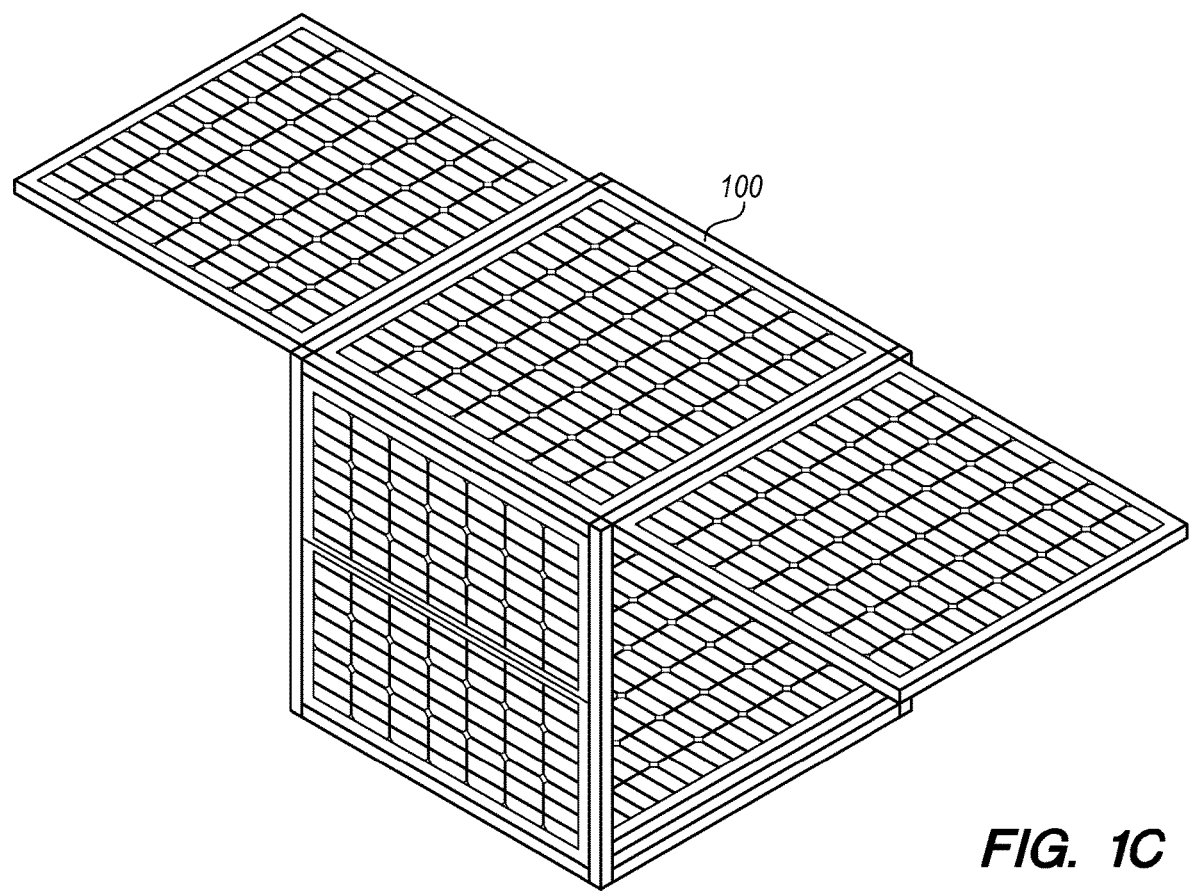
FIG. 1C is a perspective view of a solar cube unit in an open configuration according to an embodiment of the present invention.

A Parts List of components described further below with respect to the Figures is provided below for convenience:

| | Parts List |
|---|---|
| FIG. 1A | solar cube unit 100, solar panel(s) 110, hinge(s) 115 |
| FIG. 1B | solar panels 110B, 110F, 110R, 110T, hinges 115A-D |
| FIG. 1C | solar cube unit 100 |

-continued

Parts List

Figure 2A:
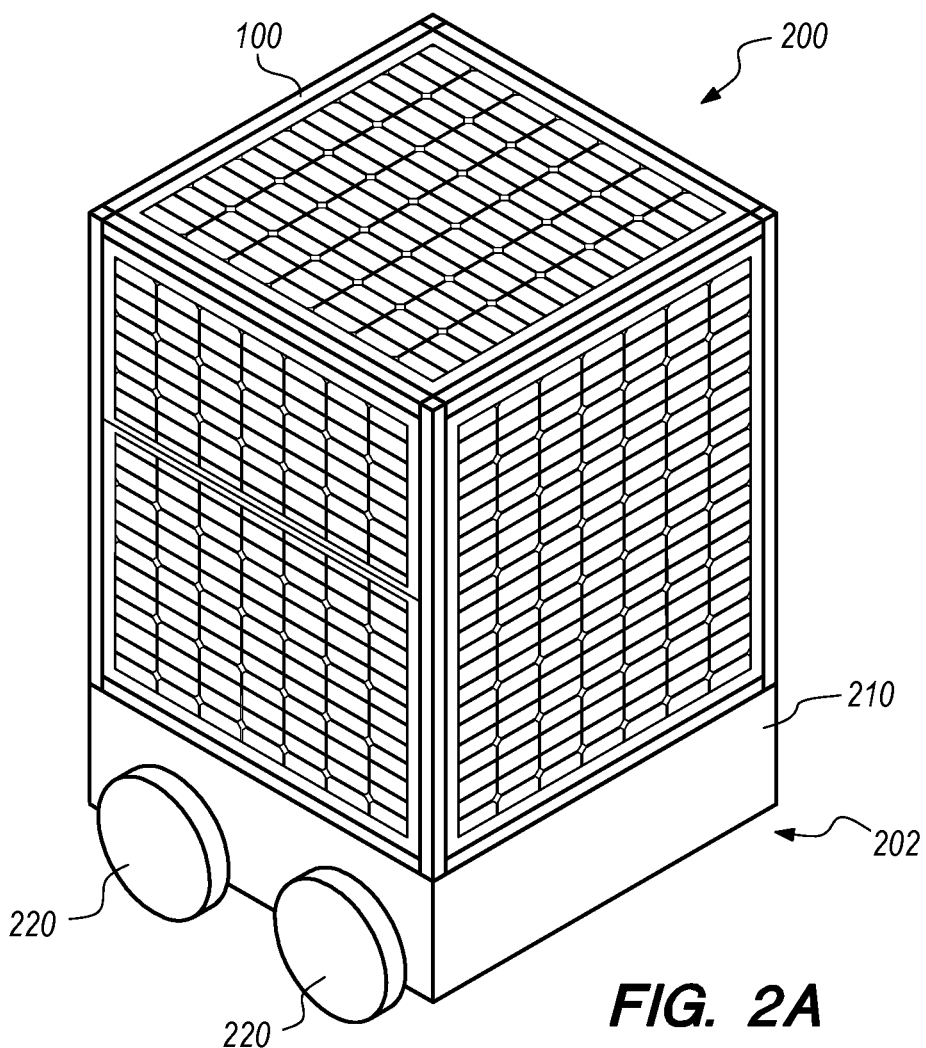
FIG. 2A is a perspective view of a wheeled solar cube unit in a closed configuration according to another embodiment of the present invention.
Figure 2B:
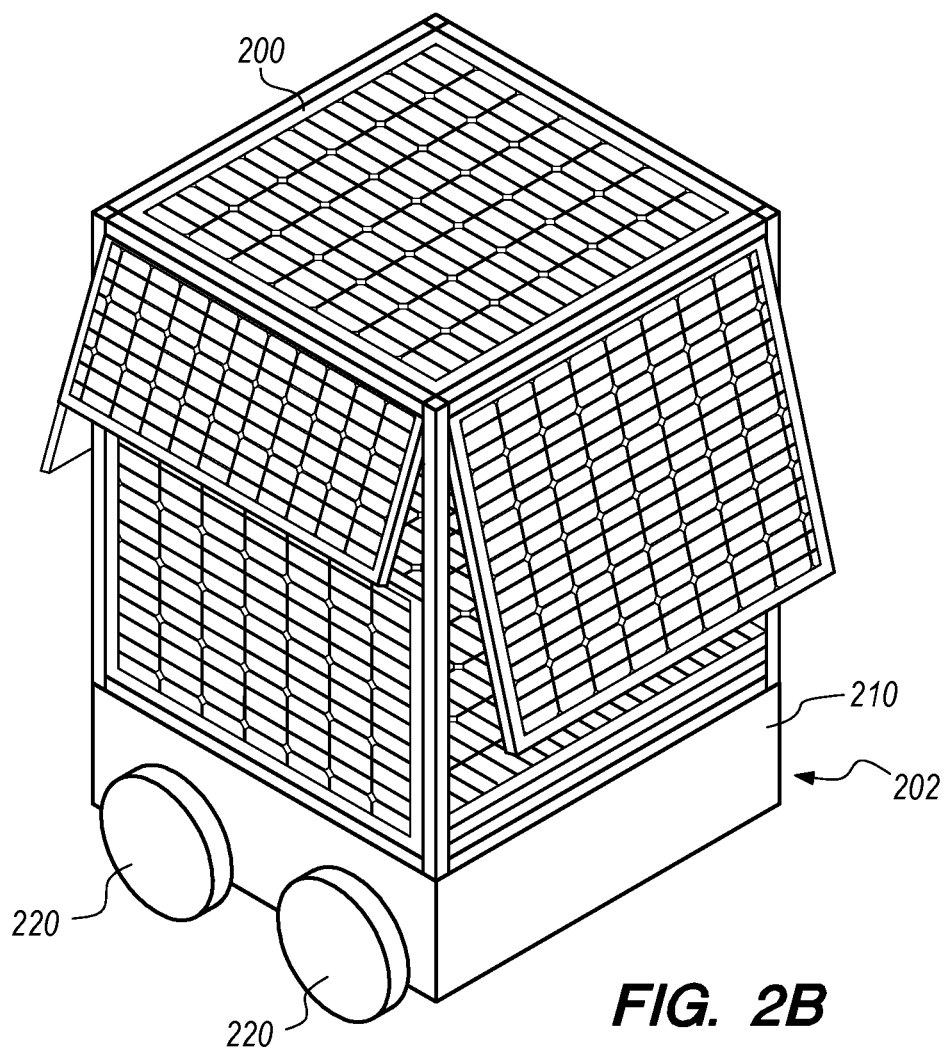
FIG. 2B is a perspective view of a wheeled solar cube unit in a partially open configuration according to another embodiment of the present invention.
Figure 2C:
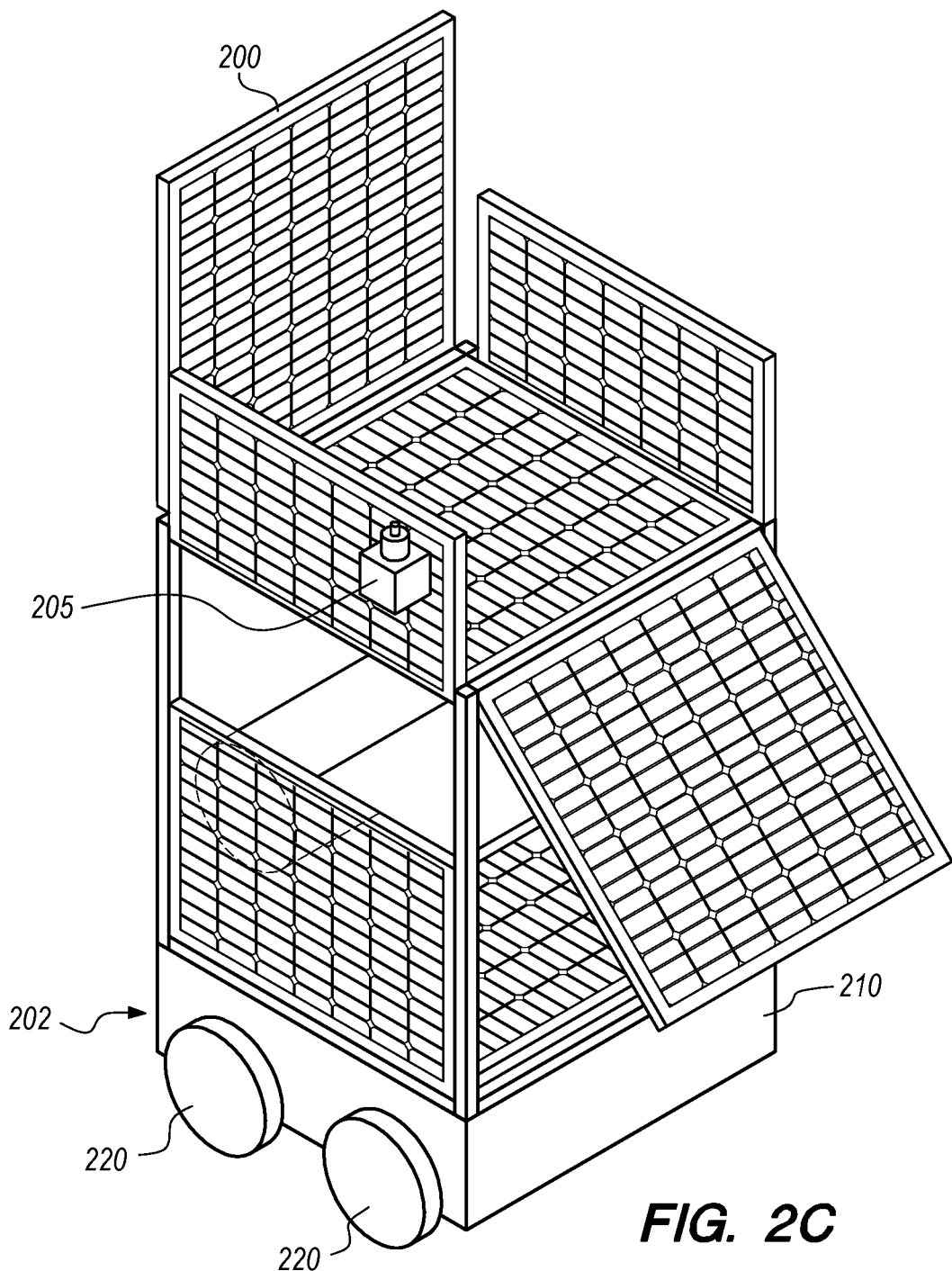
FIG. 2C is a perspective view of a wheeled solar cube unit in an open configuration according to another embodiment of the present invention.
Figure 3A:
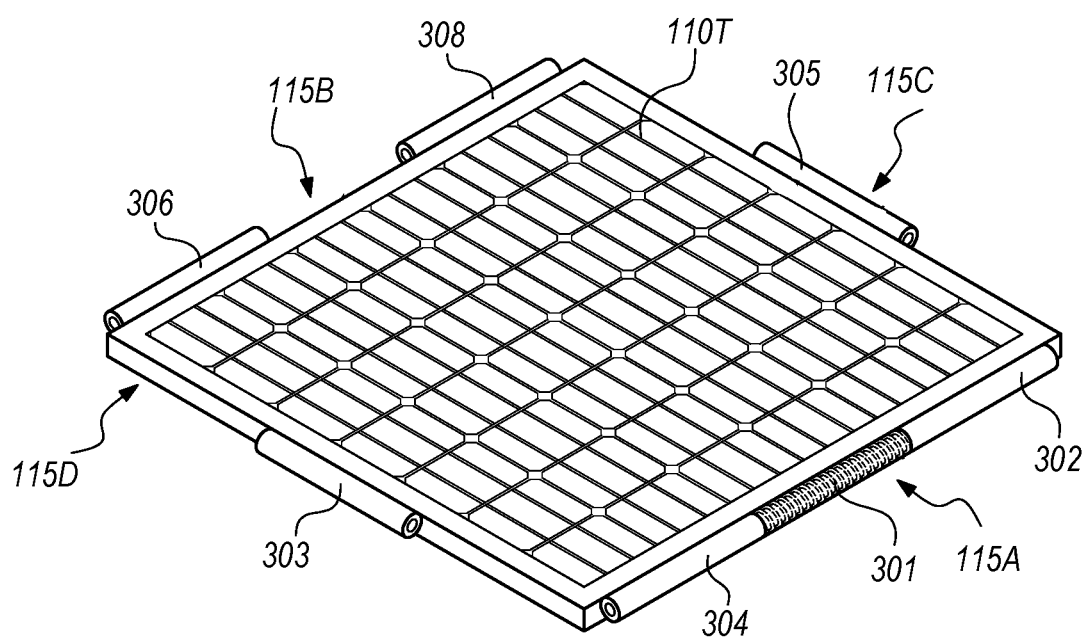
FIGS. 3A and 3B are diagrams illustrating a rod and hinge coupling mechanism for adjacent panels in accordance with a further embodiment.
Figure 3B:
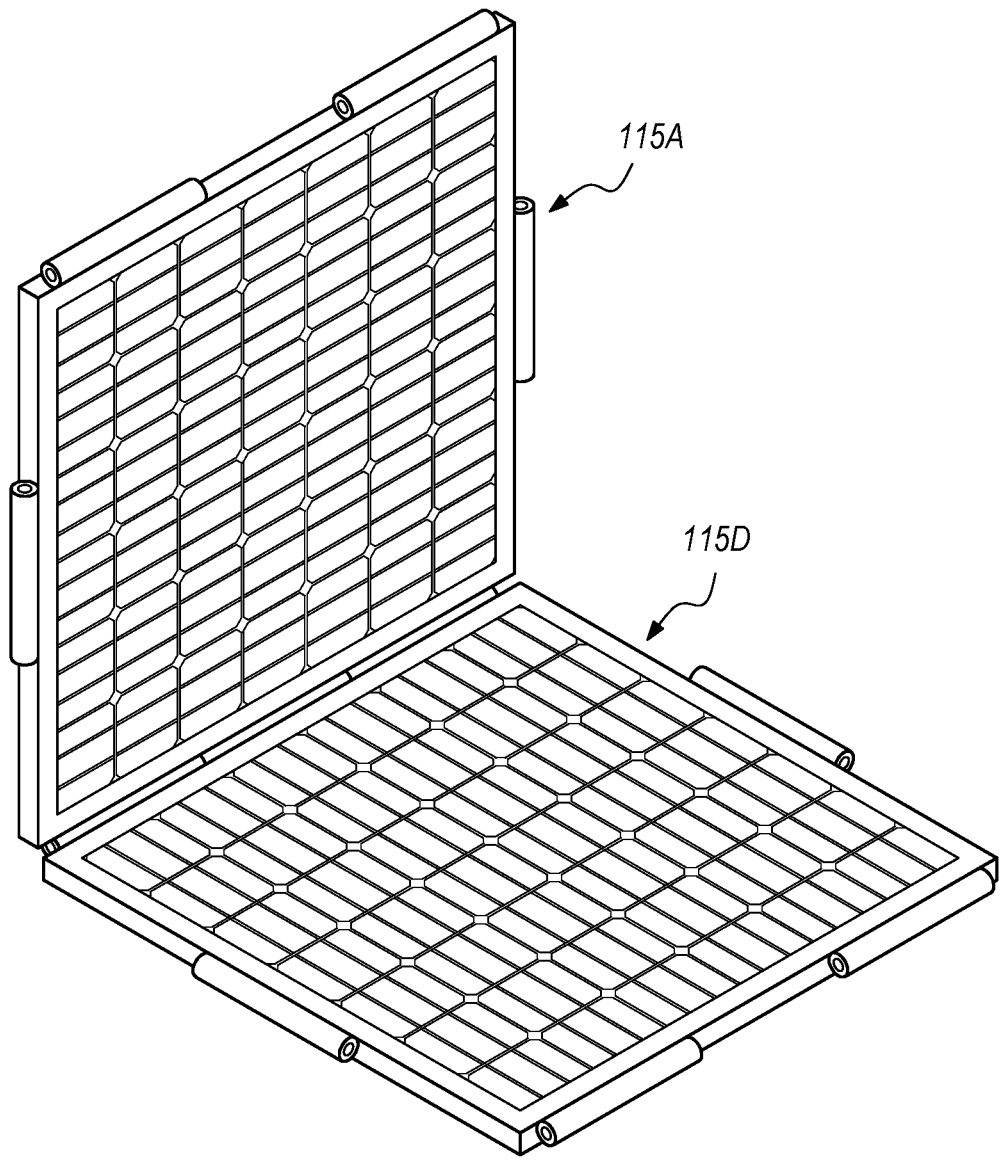
Figure 4:
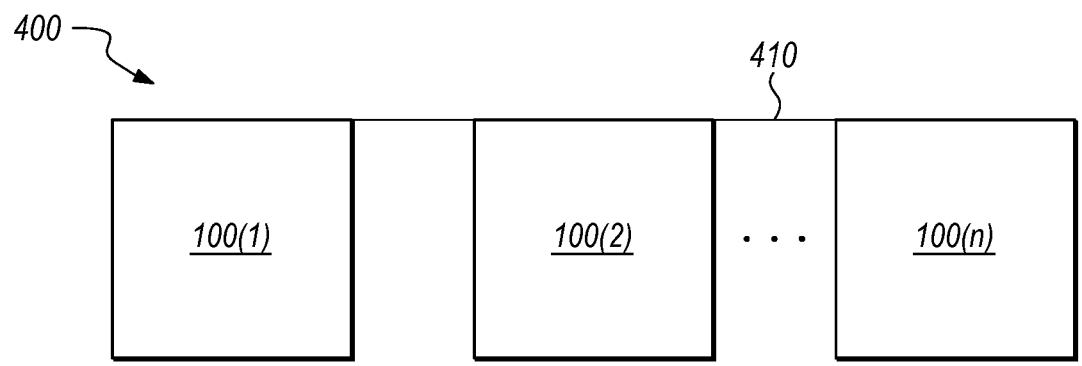
FIG. 4 is a diagram that illustrates multiple solar cube units connected in a scalable network arrangement.
Figure 5A:
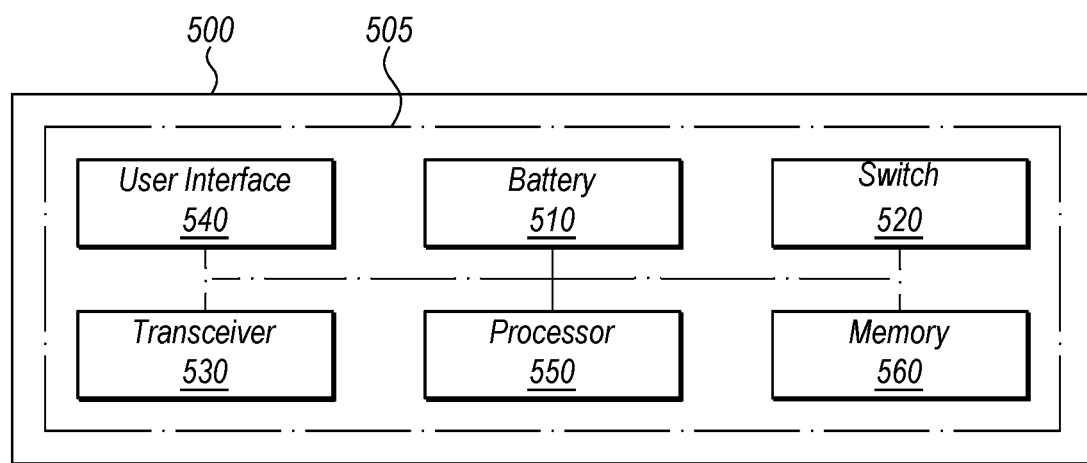
FIG. 5A is a diagram that illustrates electrical components of a solar cube unit according to an embodiment.
Figure 5B:
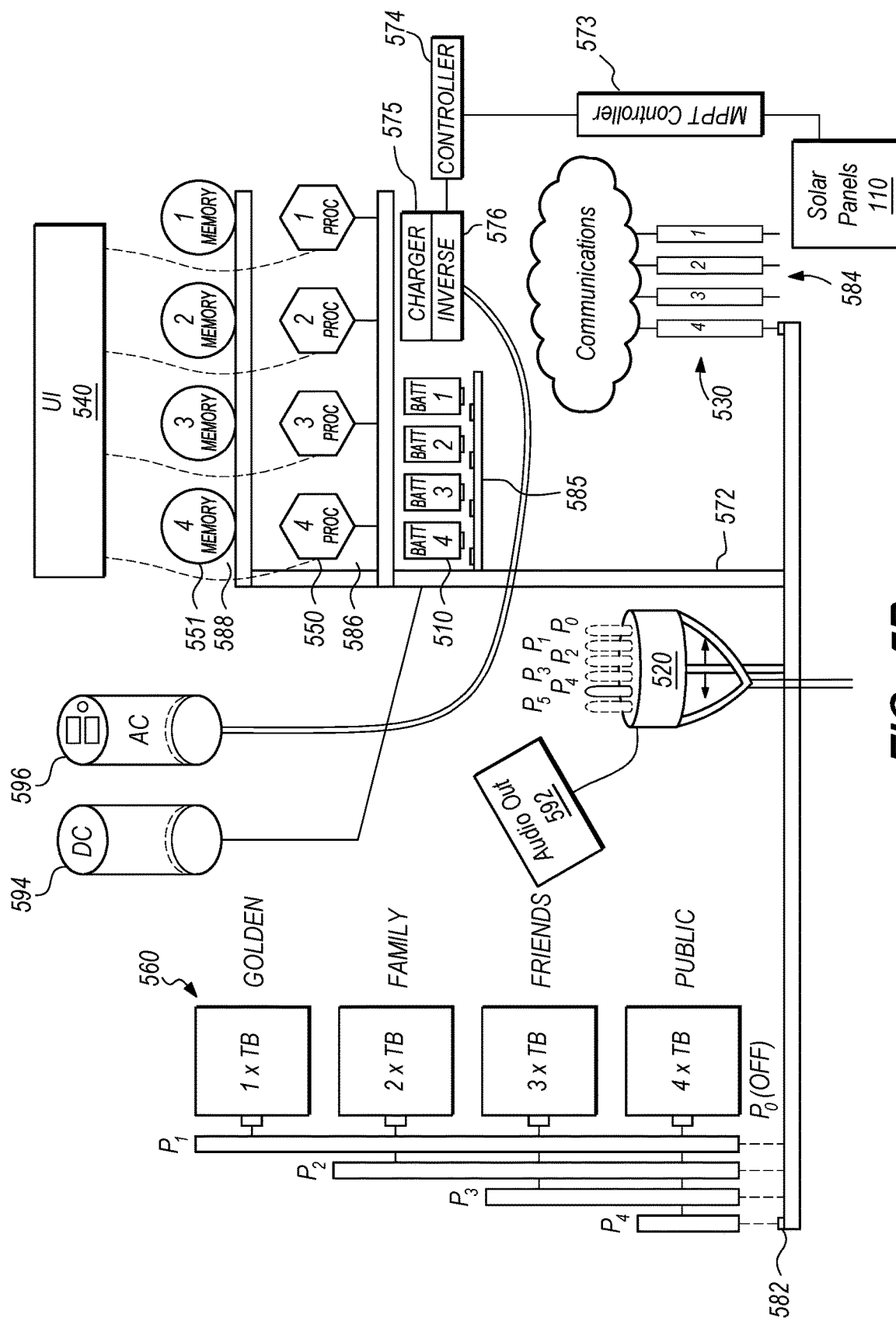
FIG. 5B is a diagram that illustrates electrical components of FIG. 5A in further detail according to an embodiment.
Figure 6A:
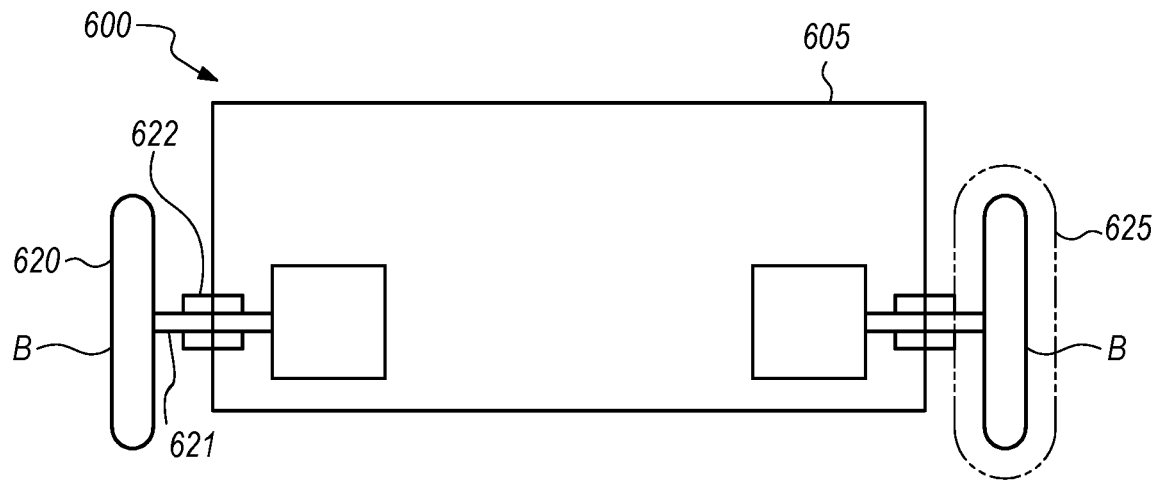
FIG. 6A is a cross-sectional view of a skateboard solar unit along a longitudinal axis A-A perpendicular to a latitudinal axis B-B according to an embodiment of the present invention.
Figure 6B:
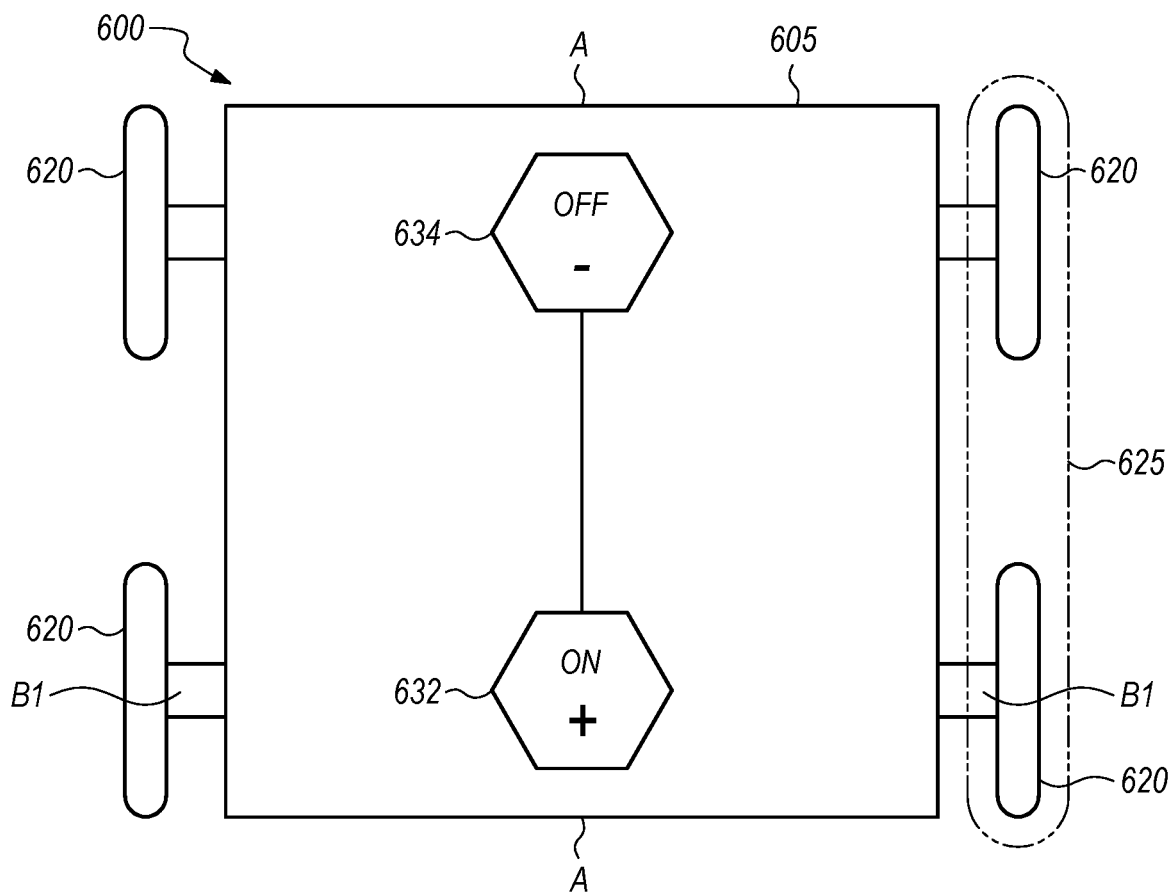
FIG. 6B is a top view of a skateboard solar unit perpendicular to both longitudinal axis A-A and latitudinal axis B-B according to an embodiment of the present invention.
Figure 7:
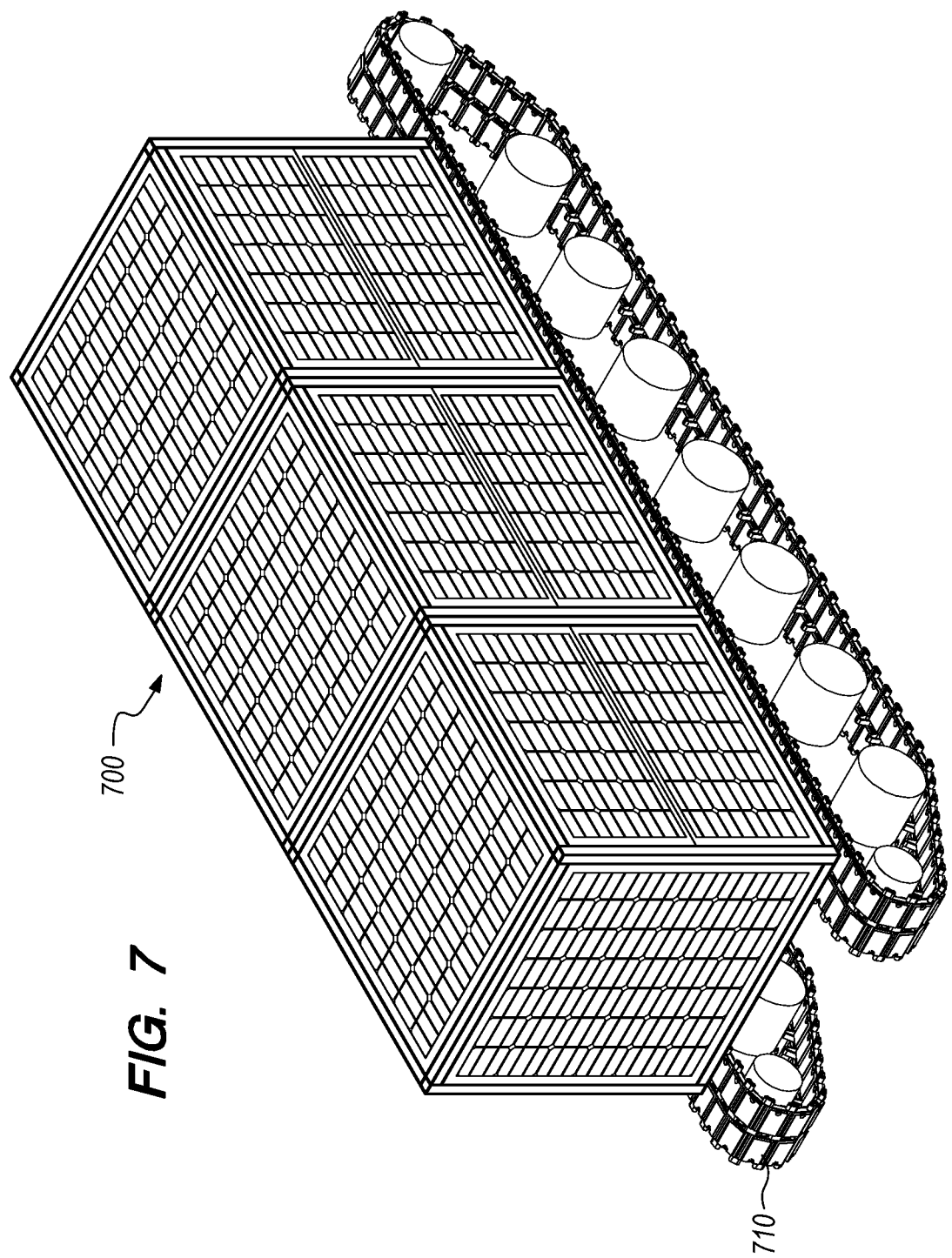
FIG. 7 is a perspective view of multiple solar cube units in closed configurations coupled to one another for secure transport on a tracked vehicle according to an embodiment of the present invention.

| | |
|---|---|
| FIGS. 2A-2B | wheeled solar cube assembly 200, solar cube unit 100, skate unit 202, base 210, wheel(s) 220. |
| FIG. 2C | wheeled solar cube assembly 200, solar cube unit 100, skate unit 202, switch 205, base 210, wheel(s) 220. |
| FIG. 3A | hinges 115A-D, sleeves 301-306, 308 |
| FIG. 3B | hinges 115A, 115D |
| FIG. 4 | solar cube units 400, output line 410, solar cube units 100(1), 100(2), to 100(n). |
| FIG. 5A | Electronics 500, Faraday cage 505, battery 510, switch 520, transceiver 530, user-interface 540, processor 550, storage memory 560 |
| FIG. 5B | solar panel(s) 110<br>battery 510 (array of selectable batteries)<br>switch 520 (selector switch)<br>communications 530 (array of selectable transceivers)<br>user interface 540<br>array of selectable processors 550<br>array of selectable memory devices 551<br>storage memory 560 (array of selectable hard drives)<br>moveable support member 572<br>MPPT controller 573<br>controller 574<br>charger 575<br>inverter 576<br>moveable contact arms 582, 584, 585, 586, 588<br>audio output 592<br>DC interface 594<br>AC interface 596 |
| FIG. 6A | skateboard transport unit 600<br>base 605<br>a set of wheels 620<br>axles 621<br>non-conductive sleeves 622 |
| FIG. 6B | skateboard transport unit 600, on button 632, off button 634, wheel(s) 620, track(s) 625 |
| FIG. 7 | vehicle 700, tracks 710 |

Solar Cube Unit

FIG. 1A is a perspective view of a solar cube unit 100 in a closed configuration according to an embodiment of the present invention. Solar cube unit 100 includes solar panels 110 and hinges 115. In the example shown in FIG. 1A, six solar panels 110 are arranged in a cubic configuration having a top side, bottom side, and four sides (also called front, rear, left, right as viewed along a direction D).

In an embodiment, solar cube unit 100 has solar panels 110 on at least five of the six sides forming an approximate Faraday cage to shield electronic components from electromagnetic radiation. For example, each panel may be approximately 24 inches×24 inches and may operate as an electromagnetically shielded and mobile box of computational infrastructure. Each solar cube unit 100 may contain energy generation (e.g., solar panels and DC motors) and electrical storage (e.g., chemical batteries or pressurized systems); tiered knowledge storage and computation; and proprietary knowledge and energy transmission connections. Each solar cube unit 100 may also be arranged to operate in open, closed, and partial open modes (which correspond to levels of Faraday integrity, as well as tier of compute access, collectively "security modes").

One or more solar panels 110 on sides of the cube unit 100 may be lifted up by a user to reveal an interior with further electronic components. FIG. 5A shows an example embodiment of electronics 500 positioned within solar cube unit 100. These electronic components 500 may include for example a battery 510 (e.g., 1-3 kW hour battery), switch 520, a transceiver 530, user-interface 540, processor 550, and memory 560. A dashed line interconnecting these components is used to indicate the selective connectivity imparted by switching between modes according to a feature of an embodiment.

Switch 520 is a selector switch that varies a level of security and communications state depending upon a particular mode selected. Transceiver 530 provides one or more types of communications between the solar cube unit 100 and external devices. These communications may be data communications over wired or wireless communication links. User-interface 540 can be any type of graphical, tactile, audio and/or other interface for allowing a human user to interact with solar cube unit 100. User-interface 540 may include a display screen, touch screen display, microphone, speaker and/or other input or output (I/O) devices and peripheral devices. In one example, memory 560 may storage memory to store data. This may include sufficient data storage for a tiered and abridged copy of human knowledge. Processor 550 can be any type of processor for executing computer-readable instructions.

Protected by a Faraday cage 505 (formed by panels 110 and hinges 115) when operating in a closed (island) mode, the contents of the solar cube unit 100 are impervious to most known threats to a bulk electric system, such as, an electromagnetic pulse (EMP). With just a couple of terabytes (TB) of protected data, an owner can retain all knowledge important to an owner such as music and photos, healthcare information, and estate planning documents. Other information may be stored that aid survival and recovery such as information helpful to restoring local or even national supply chains. A solar cube unit 100 may also aggregate available data and provide extreme event warnings to a solar cube unit owner's or other user's cell phone or wireless 5G connection. Solar cube unit 100 is also mobile, and can be taken into secure buildings during extreme wind, water, fire, weather or climate crisis events. In all extreme events, solar panels can charge off of interior lighting if available.

Security Modes

In an embodiment, solar cube unit 100 may be operated in open, closed, and partial open closed security modes. Switch 520 is a selector switch that controls which security mode a solar cube unit 100 is configured. For example, when in a closed mode, solar cube unit 100 is fully shielded and cannot communicate with any external device not integrated into the shielding. Closed mode allows access to all processing, data, and energy capabilities via hardwired and serial specific screen/keyboard/mouse.

When in partial open-closed mode, the system can only transmit and receive information to other identical solar cube units 100 via proprietary wired or wireless connection. When in partial open-closed mode, the system can produce or export energy to other approved devices (such as, heaters, refrigeration, habitat support, or high-frequency (HF) radio.)

When connected to another solar cube unit 100 via proprietary shielded connection, an internal protocol allows access to portions of processing function, energy and data storage. A portion may be any fraction or ratio of available states or capability. For example, a portion may be 97% of processing functions, 97% of energy, and 60% of data in data storage. Multiple solar cube units 100 can be joined in series and parallel in partial open-closed mode to power larger energy or computational needs.

Finally, when in open mode, solar cube unit 100 may transmit and receive data via wireless and wired methods with an open internet or other external data communication. When operating in open mode, certain data and processing capabilities may still be inaccessible to other hardwired storage and processing capabilities. For instance, when in open mode, solar cube unit 100 may be limited to another portion of processing function, energy and data storage. This another portion may be any fraction or ratio of available states or capability. For example, another portion may be 3% of processing functions, 3% of energy, and 10% of data in data storage. Moreover, to tailor a security level to an open mode a solar cube unit 100 can be configured to only execute preprogrammed operations—and can accept no new external executable data.

In one embodiment, regardless of the modes or configuration used, one section of a processor 550 and/or memory (including storage memory 560 or other memory such as a cache and/or main memory) cannot be directly connected with the Internet—it will have always been air-gapped. Information could only be moved to this most protected portion while operating in closed mode, and would require certain quarantine processes before admission.

Selector Switch

FIG. 5B is a diagram that illustrates electrical components of FIG. 5A in further detail according to an embodiment. Controller 520 is a selector switch. Selector switch 520 may be manually switched by a user to different security modes. In embodiments, each security mode may correspond to a particular level of access to solar cube unit hardware. In one feature, a level may correspond to a particular fraction or portion of battery 510, transceiver 530, processor 550, or memory (including storage memory 560 and/or other memory 551, such as, a cache and/or main memory). One level may also correspond to a closed, fully-shielded security mode where no or substantially no access is provided to the secured hardware. In the example shown in FIG. 5B, selector switch 520 may be moved between six selector switch positions P0-P5 corresponding to five different security modes. In another embodiment, the selector could be moved between 128 different switch positions. Other numbers of switch positions may be used.

In one embodiment, switch 520 is coupled to a moveable support member 572. Switch 520 may be mechanically coupled or electromechanically coupled to moveable support member 572. Human hands, micromotors, actuators, or other devices not shown can drive moveable support member 572.

In response to a switch position of the switch 520, support member 572 selectively engages battery 520, transceiver 530, processor 550, and storage memory 560 to set a particular security mode. For example, as shown in FIG. 5B, moveable support member 572 may have one or more contact arms 582, 584, 585, 586, 588 that have respective contacts that selectively engage different portions of battery 510, transceiver 530, processor 550, and storage memory 560.

In one embodiment, switch 520 may be a slider selector switch that may be moved in either direction along a line between six positions P0-P5. For convenience, two end positions P0 and P5 may each correspond to a closed security mode. In this closed mode, moveable support member 572 engages a Faraday lock to electromagnetically shield hardware within solar cube unit 100. No or substantially no access is provided to the secured hardware including no or substantially no access to battery 510, transceiver 530, processor 550, memory 551 and storage memory 560.

In switch position P1, moveable support member 572 positions one or more contact arms to that engage with all portions of battery 510, processor 550, and storage memory 560. For example, one or more contacts 582 may engage four 1 TB hard drives in a hard drive stack 560. One or more contacts 585 may engage four batteries in an array of batteries 510. One or more contacts 586 may engage four processors in an array of processors 550. One or more contacts 588 may engage four memory devices in an array of memory devices 551. For communications, moveable support member 572 positions one or more contact arms to engage one or more contacts 584 only with UI 540 and to not engage any of the types of communications 530 providing different levels of access including access to local and global networks or devices through wireless (e.g., Bluetooth, Wifi, 5G) and wired communications (e.g., USB, Ethernet).

In switch position P2, moveable support member 572 positions one or more contact arms to engage with ¾ of battery 510, transceiver 530, processor 550, and storage memory 560. For example, one or more contacts 582 may engage three of four 1 TB hard drives in hard drive stack 560. One or more contacts 584 may engage types of communications 530 providing access to UI 540, access only to local networks or devices through wired communications (e.g., USB, Ethernet) with software verification but no wireless communications or access to remote Internet or world wide web (WWW) communications. One or more contacts 585 may engage three of four batteries in an array of batteries 510. One or more contacts 586 may engage three of four processors in an array of processors 550. One or more contacts 588 may engage three of four memory devices in an array of memory devices 551.

In switch position P3, moveable support member 572 positions one or more contact arms to engage with ½ of battery 510, transceiver 530, processor 550, and storage memory 560. For example, one or more contacts 582 may engage two of four 1 TB hard drives in hard drive stack 560. One or more contacts 584 may engage types of communications 530 providing access to UI 540, access to local networks or devices through wireless (e.g., Bluetooth, Wifi, 5G) and wired communications (e.g., USB, Ethernet) with software verification but not access to remote Internet or WWW communications. One or more contacts 585 may engage two of four batteries in an array of batteries 510. One or more contacts 586 may engage two of four processors in an array of processors 550. One or more contacts 588 may engage two of four memory devices in an array of memory devices 551.

In switch position P4, moveable support member 572 positions one or more contact arms to that engage with ¼ portions of battery 510, transceiver 530, processor 550, and storage memory 560. For example, one or more contacts 582 may engage one of four 1 TB hard drives in hard drive stack 560. One or more contacts 584 may engage types of communications 530 providing access to UI 540, access to local and global networks or devices through wireless (e.g., Bluetooth, Wifi, 5G) and wired communications (e.g., USB, Ethernet) including access to remote Internet or WWW communications. One or more contacts 585 may engage one of four batteries in an array of batteries 510. One or more contacts 586 may engage one of four processors in an array of processors 550. One or more contacts 588 may engage one of four memory devices in an array of memory devices 551.

These fractions, hard drive sizes and access levels are illustrative and not intended to be limiting.

These switch positions are also illustrative and not intended to be limiting. A larger or smaller number of switch positions, different types security modes, and different order or sequence of security modes, and different combinations thereof may be used.

Switch 520 may also be coupled to an audio interface 592 to initiate sending an audio signal (such as a tone or message) indicative of changing of the switch position or identifying a switch position or to convey critical system messages through the Faraday cage 505.

Solar panels 110 may also be coupled to a MPPT controller 593 and further to controller 594 and to inverter 596. Inverter 596 inverts charge collected at solar panel(s) 110 and outputs to charger 595. Charger 595 is electrically coupled to batteries 510 (not shown in FIG. 5B for brevity). In this way, charge collected at solar panel(s) 110 may be stored in batteries 110 under the control of controllers 593, 594 and inverter 596. A DC interface 594 and an AC interface 596 may also be provided to output DC and/or AC current as desired outside of cube unit 100. For example, DC and/or AC current in excess of what batteries 510 may store may be output or during times when net metering or feedback of power to a grid or other external solar cube unit is needed.

Hinges

In FIG. 1A, six solar panels 110 and hinges 115 are arranged in a closed configuration so that the panels are perpendicular to one another and solar cube unit 100 has an overall cubic shape. In one embodiment, each solar panel 110 is made up of one or more solar modules. Each solar module may be a packaged and connected assembly of photovoltaic cells (also called solar cells). In an embodiment, five sides 110, namely, a top and four sides may have solar panels. A bottom side panel which typically does not receive as much sunlight and is subjected to more wear or dirt from the ground may be made of other suitable materials, such as, stainless steel, aluminum, titanium, or other metals, alloys, synthetic plastics, wood, or other combinations of metal and/or non-metal materials.

As shown in FIGS. 1A-1C, hinges 115 are provided to support closed, partially open, and open configurations of solar cube unit 100. Hinges 115 may be provided on one or more edges of solar panels 110. As shown in FIG. 1B, in one embodiment, hinges 115A, 115B are provided on at least two opposing sides of a top solar panel 110T for coupling to front and back solar panels 110F, 110B. Hinges 115C, 115D are provided on two other opposing sides of a top solar panel 110T for coupling to left and right solar panels 110L, 110R.

In one feature, a hinge 115 (also called a rod hinge) may be a sleeve assembly that can received a connecting rod. End couplers may be inserted to hold connecting rods and sleeve assemblies in place between different solar panels. FIG. 3A shows two types of example hinges 115A-115D (also called B and C hinges) that may be used for solar panel 110T. As shown in FIG. 3A, hinges 115A, 115B are C rod hinges. Hinges 115C, 115D are B type rod hinges. Hinge 115A includes two sleeves 302 and 304 positioned on one side of solar panel 110T. Likewise, hinge 115B includes two sleeves 306 and 308 positioned on one side of solar panel 110T opposite hinge 115A. Hinge 115D includes a sleeve 303 positioned on one side of solar panel 110T opposite hinge 115C. Hinge 115C includes a sleeve 305 positioned on one side of solar panel 110T opposite hinge 115D. Sleeves 302 and 304 are separated by a distance at least equal to the length of sleeve 303 or 305. Sleeves 306 and 308 are also separated by a distance at least equal to the length of sleeve 303 or 305. Other solar panels in solar cube unit 100 also include similar hinges 115 along their sides.

In an embodiment, removeable rods may be placed along respective sides of solar panels within respective sleeves (also called barrels). End couplers may be placed to secure removeable rods within the sleeves. In practice, to couple two sides of adjacent solar panels 110, a B type hinge on one side of a solar panel is aligned with a C type hinge of the other solar panel. A removeable rod may be placed along respective sides of solar panels within respective sleeves of the B and C type hinges as shown in FIGS. 3A-3B. For example, sleeve 301 in FIG. 3A belongs to a B type hinge on another panel (not shown for clarity). A removeable rod would extend through sleeves 304, 301, and 302 to couple the two solar panels. End couplers (such as retractable end couplers) may be placed to secure removeable rods within the sleeves. FIG. 3B shows two solar panels coupled together by a rod hinge 115B.

In one example of a six-sided solar cube unit 100, twelve removeable rods may be inserted along respective sides of the unit. In a further feature, the removeable rods contain batteries, water, or pressurized air, or additional metal for structural support when multiple solar cube units are joined together. The rods can be used to create antenna stands. Rods may also be lockable. As a defensive measure a battery in a key, when fully charged, will be enough to stun a human, and power up a skateboard and a solar cube unit from a dead state.

Each solar panel 110 may have two B type hinges and two C type hinges. End couplers may be 3-sided couplers "D" and eight may be used for all the corners of a six-sided solar cube unit 100.

In one example, the two B type hinges are on opposite sides of a panel, and the two C type hinges are on the other pair of opposing sides as shown in FIG. 3A. In a further example, the two B type hinges are on adjacent sides of a panel that share a corner, and the two C type hinges are on the other pair of adjacent sides.

Mobile Solar Cube Assembly

In further embodiments, a solar cube unit 100 may be coupled to a skate assembly or a skateboard assembly. In one feature a bottom solar panel of solar cube unit may be replaced by or attached to a skateboard. Further, for an even more compact design, a portion A of rod hinge 115D may be used to mechanically couple a skate assembly or skateboard assembly having wheels.

In a further feature shown in FIGS. 2A-2C, a wheeled solar cube assembly 200 may be made up of a solar cube unit 100 supported by a skate unit 202 having a base 210 and one or more wheels 220. Solar cube unit 100 may also be configured in open, partially-open and closed configurations and may be operated in different security modes.

For example, as shown in FIG. 2A, base 210 may have multiple wheels 220 or tracks and allows a solar cube unit 110 to be more easily moved or transported in the event of a disaster or other need for use. In FIG. 2A, wheeled solar cube assembly or unit 200 is in a closed configuration. In FIG. 2B, wheeled solar cube unit 200 is in a partially open configuration. In FIG. 2C, wheeled solar cube unit 200 is in an open configuration for activation as a wheelchair transport according to another embodiment of the present invention. A controller 205 (such as a joystick) may allow a user to control movement and direction of movement.

Further embodiments of wheeled assemblies that can support a solar cube unit 100 are described with respect to a skateboard assembly of FIG. 6.

In another example, the combined solar cube unit 100 and skate unit 202 may become a trailer or human operated vehicle. Solar cube unit 100 can ride on a skateboard that is wheeled, which contain DC motors and additional energy and data storage to power wheels under predictable controls and regenerate electricity. Skateboards can be electrically connected to solar cube units 100 from the bottom and maintain shielding. DC motors can also have attachments of electrical grinders, drills, water wheels, wind power blades, etc. When a skateboard operates with DC only current, a solar cube unit 100 may include a DC/AC converter to convert DC to AC. Skateboards can be joined to create chains of solar cube units that can be pulled or pushed in train multiple units wide or long.

A proprietary track system can be attached and driven or pulled when joined in a sheet of skateboards between 2×2 and 4×32 large (which for a 24"×24"×24" cube unit would still fit on a U.S. road. Wider loads can be used for wider roads or off road operations.

When a skateboard is not occupied by a solar cube unit, the skateboard can be used to transport (powered or pulled) anything that will fit in a proprietary basket (baskets are of at least four varieties).

For hand to skateboard pulling or driving—for pulling/pushing by a bike—for pulling by an ATV/Horse—or pulling by a DOT approved vehicle on any road in America.)

A skateboard is directional. There is a front, a back, a right, a left, a top, and a bottom. The top and the bottom connections are mirror images of one another, as are the left and right. In one example, male connections protrude from the top of skateboard. The female connections are on the bottom of the skateboard and the bottom of the solar cube unit. A female port is integrated into the front and rear of the skateboard. The skateboards are connected using a proprietary male-male connection. The axles from the dc motors are male on the left and female on the right. Wheels will be specific to the right or left side. A skateboard can be joined to another on front-back or right-left. Access to the internal controls and battery are accessible via removal of the top panel. The axles of the dc motors will connect via transition to a non conductive axle.

Skateboard Transport Unit

In a further embodiment, a skateboard transport unit 600 for a solar cube unit 100 is provided. FIG. 6A is a cross-sectional view of a skateboard transport unit 600 along a longitudinal axis A-A in a direction D perpendicular to a latitudinal axis B-B according to an embodiment of the present invention. Skateboard transport unit 600 includes a base 605 and a set of wheels 620. The set of wheels may rotate relative to base 605 and support base 605 through respective axles 621. Non-conductive sleeves 622 are positioned between axels 621 and base 605 to provide electrical isolation.

In a further embodiment, switch position P1 of switch 520 as described above can further include a coupling to skateboard transport unit 600 having a hard drive, processor, memory and battery which can only be accessed through the coupling at switch position P1. In this way, UI 540 may be a user-interface for controlling skateboard unit 600.

FIG. 6B is a top view of a skateboard transport unit 600 perpendicular to both longitudinal axis A-A and latitudinal axis B-B according to an embodiment of the present invention. In this example, two buttons 632, 634 are provided on base 605. Button 632 is an on button that raises when a user pushes down. Button 634 is an off button that lowers when a user pushes down. In a further optional example, wheels 620 may be placed within tracks 625. For example, wheels on one side of skate unit 620 may be in one track 625, while wheels on the other side of skate unit 620 are placed in another track (not shown). In this way, tracks may be used to provide traction for all types of terrain. This may be especially needed in case of disaster, national emergency or use in a remote location away from roads.

Also, in a further feature, to lock into a solar cube unit 100 (cube unit) into base 605 of skateboard unit 600 in one embodiment there may be 4 one inch cubes of metal (or ¹⁄₂₄ of the skate W×H) in each corner (as viewed looking down on FIG. 6B) that are part of the skateboard unit 600 (in initial embodiment is 2'×2' but ratio stays ¹⁄₂₄). These cube connectors may be flush in each corner (looking down on FIG. 6B) so that they will insert to junction of 4 vertical panels and 1 horizontal panel that meets skate. These 1 inch cubes will take place of other connectors utilized when solar cube unit 100 is standing alone. The connectors will allow other devices, such as baskets, carts, beds, etc., to be attached to the skateboard unit 600.

In a further feature, multiple solar units 100 may be interconnected to create a network. FIG. 4 shows an example collection of solar cube units 400 having a number n of solar cube units 100(1), 100(2), to 100(n), where n is an integer. The solar cube units 100(1), 100(2), to 100(n) at least electrically coupled to one another to form a network. In particular, output ports of each unit 100(1), 100(2), to 100(n) may be coupled to an output line 410. In this way, power from each unit 100 may be provide electrical power. One advantage is the flexibility and scalability the modular nature of solar cube units 100 provide. Any number of solar units 100 may be interconnected and can be configured in different arrangements and added or removed at different times. Solar units 100 can be arranged in different layouts, such as a line, mesh, grid, or other pattern depending upon available space. Solar units 100 can also be stacked on one another. Collections of solar units 100 of varying sizes depending upon need can be deployed to power waste water treatment, hospitals, banks, and other critical infrastructure.

In a further example, skateboard transport units 600 may also added to support a collection of solar units 100. For example, when solar units 100 and/or 200, and skateboard transport units 600 are joined, they may create a mobile power supply for a tiny city.

FIG. 7 is a perspective view of multiple solar cube units in closed configurations coupled to one another for secure transport on a tracked vehicle 700 with tracks 710 according to an embodiment of the present invention. Tracked vehicle 700 can include 200 solar cube units 100 and 200 skateboard transport units 600 coupled to one another as described herein. Additional components may be used such as 4-sided couplers to provide further support for internal cube units in a stack. Windows and track supports may also be used. Extra supports or panels may be used internally to create walls, tables, and other interior configurations.

In a further example, about 80-100 solar cube units 100 and skate or skateboard assemblies (e.g., 480-600 solar panels 110 and 80-100 skates 600) may make an aggregation sized to fit a semi-trailer truck. This example may provide about 32-248 support panels for building internal walls, tables, doors, beds, and/or pup trailers. This can vary depending upon the number solar cube units and size of vehicle 700. In examples, a rectangular aggregation such as 700 may have a size in a range of about 20 feet long by 4 feet wide by 4 feet tall to 26 feet long by 4 feet wide by 6 feet tall.

This tracked vehicle example is illustrative and not intended to be limiting. Different configurations are possible with different numbers of solar cube units 100. A 200 member tiny city is but one example and smaller and larger numbers of solar cube units may be used and transported on a tracked vehicle or other type of vehicle.

Multiple collections of solar cube units 100 roof may also be arranged on buildings, such as, roofs or other sunlit areas. A roofing configuration may contain at least one horizontal surface with greater than 50% of square footage containing solar cells.

A solar cube unit 100 may operate in a grid-tie, meshed, and closed mode. In a closed mode, a solar cube unit 100 can withstand EMP or other electromagnetic disturbances. In a meshed mode, a solar cube unit 100 connects to other solar cube unit 100 in series and/or parallel to power larger technology in a Bulk Electric System failure scenario. In grid-tie mode, a solar cube unit 100 provides demand response and solar power to the Bulk Electric System.

These applications are not intended to be limiting. In further applications, solar cube unit 100 may have other functions to appeal to consumers. For example, when two sides are open as shown in FIG. 1C, it operates as a coffee table and a sound system that is the centerpiece of a home, campsite, worksite, hunting camp, office space, or classroom. Other optional functions are AED for first responders and jump starter/charger for dead batteries on vehicles. Examples of an open solar cube units 100 used as furniture for humans include dining tables, side tables, wheel chairs, coffee tables, and cots. A solar cube unit 100 may be configured as furniture to contain one horizontal surface even when greater than 50% of the square footage contains solar cells.

A solar cube unit 100 can rest on several different wheeled setups for mobility during extreme events. A solar cube unit 100 may be configured as a standard 4-wheeled setup that allows it to be pushed or pulled by hand, pulled by a bike, golf cart, ATV, or other vehicles.

In further examples, solar cube units may contain hinges which, when disconnected, join together to create towers for hosting antennas. Solar cube units may also be waterproof or air tight. A high-frequency (HF) transmitter may be integrated into the solar cells of panels 110. In an embodiment with proprietary connections, the connections may be hexagonal, because the solar cube units, when joined, create mobile hives.

In a further embodiment, solar cube unit 100 may be hardened to allow operation and recovery from extreme events. In an embodiment, a lock may be added to maintain faraday integrity, and secure commercially available solar cells, charge controllers, DC motors, data storage, computers, and lithium-ion Li+ batteries in appropriate configurations. For example, a lock may be coupled to a solar panel 110 to lock the panel so that the solar cube unit is in a closed configuration.

In this embodiment, solar cube unit 100 and collections of solar cube units 100 are designed to withstand all extreme weather events, have immediate restart, and island with ease. Through novel design and greater penetration, the solar apparatus will provide power at the same cost as current small solar systems, and provide more resilience and security in rural and urban settings.

In an example rural application, one or more solar cube unit(s) 100 may comprise a new type of low voltage solar apparatus designed to interconnect and interface with rural co-operative and IOU net metering agreements, and run in parallel and/or series to take advantage of FERC Order 841. The solar cube unit(s) 100 can be designed to contain many ancillary benefits that appeal to rural populations.

To further enhance adoption, the solar cube unit(s) 100 have many dual functions. When closed, it can function as a side table inside or outside. When two sides are open, the solar cube unit(s) 100 may operate as a coffee table, inside or outside. Interior charging rates are sufficient to run the computer as a server for the home. The battery size can be sufficient to run an outdoor or indoor sound system (or refrigerator, campsite, hunting camp, water well, etc.) for a couple days with no sun. Other optional functions are AED for first responders and jump starter/charger for dead batteries on cars/tractors.

One or more solar cube units 100 can rest on several different wheeled setups when traveling. For example, a standard 4-wheeled setup that allows the solar cube unit(s) 100 to be pushed or pulled by hand, pulled by a bike, golf cart, ATV, or other vehicles. Another setup allows a solar cube unit 100 to function as a powered wheelchair.

In one example, a solar unit 100 is divisible into a 40' Shipping Container and may hold a server chassis such as server chassis implemented according to an Open Compute project framework available from the Open Compute Project, https://www.opencompute.org.

In the above embodiments, references to a solar cube unit are illustrative and not intended to limit embodiments to a particular shape. A solar unit may have a geometric shape that may include but is not limited to a rectangular, pyramid, or other shape. A rectangular shape may include a rectangular shape of the same or different lengths, heights, and widths, and may be but is not limited to a cubic shape. A geometric shape may also be but is not limited to a shape divisible into a shape (and size) which can legally be transported on roadways or by air or ship.

Further Embodiments and Example Implementations

Aspects of the embodiments for exemplary solar unit 100 may be implemented electronically using hardware, software modules, firmware, tangible computer readable or computer usable storage media having instructions stored thereon, or a combination thereof and may be implemented in one or more computer systems or other processing systems including processor 550 and memory 551, 560.

Embodiments may be directed to computer products comprising software stored on any computer usable medium such as memory 551, 560. Such software, when executed in one or more data processing device such as processor 550, causes a data processing device(s) to operate as described herein.

The Brief Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The breadth and scope of the present invention should not be limited by any of the above-described exemplary embodiments.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The invention claimed is:

1. A system having multiple security modes comprising:
computer-readable memory configured to provide different levels of access according to different security modes, wherein the different security modes include a closed mode, partial open mode, and open mode;
a transceiver configured to provide different levels of communication access to external devices according to the different security modes; and
a switch physically configured to select a security mode from among the different security modes, wherein the level of access provided to the computer-readable memory inversely correlates with the level of communication access provided to external devices through the transceiver across the different security modes,
further comprising another computer-readable memory separated from the computer-readable memory by a physical gap, whereby, sensitive data may be stored securely in the another computer-readable memory physically separate from the computer-readable memory regardless of security mode and transmitted to the computer-readable memory in only the closed mode, such that the external devices do not have access to the computer-readable memory or the another computer-readable memory in the closed mode.

2. The system of claim 1, wherein the switch comprises a selector switch, configured to physically move to different switch positions, that enables a user to set a security mode which determines the type of external communication permitted and the amount level of access permitted to computer-readable memory.

3. The system of claim 2, further comprising a moveable support member coupled to the selector switch, wherein in response to a switch position of the selector switch, the support member selectively controls coupling with the transceiver and the computer-readable memory to set a particular security mode from among the different security modes.

4. The system of claim 3, wherein the moveable support member includes one or more contact arms.

5. The system of claim 1, wherein the level of access provided to the computer-readable memory in the different security modes comprises different portions of available computer readable memory.

6. The system of claim 5, wherein the level of communication access provided to the external devices in the different security modes comprises different types of wired or wireless communication.

7. The system of claim 1, further comprising a Faraday cage configured to operate in the closed mode.

8. The system of claim 1, further comprising one or more solar panels and a rechargeable battery to provide electrical power to the computer-readable memory and transceiver.

9. The system of claim 1, wherein the security modes comprise at least three different security modes.

10. The system of claim 3, further comprising:
a plurality of processors, wherein the switch is further configured to select a security mode from among the different security modes, wherein the level of access provided to the plurality of processors inversely correlates with the level of communication access provided to external devices through the transceiver across the different security modes.

11. A system having multiple security modes comprising:
computer-readable memory configured to provide different levels of access according to at least three different security modes including a closed mode, partial open mode, and open mode;
a transceiver configured to provide different levels of communication access to external devices according to the different security modes; and
a switch having multiple switch positions corresponding to the at least three different security modes, each security mode corresponding to a different level of access to the computer-readable memory and a different level of communications access of external devices to the transceiver compared to other respective security modes, wherein the access to the computer-readable memory inversely correlates with different levels of communications access available to external devices to the transceiver such that more access to the computer-readable memory is provided when less communication access with external devices is provided, and
another computer-readable memory separated from the computer-readable memory by a physical gap, whereby, sensitive data may be stored securely in the another computer-readable memory physically separate from the computer-readable memory regardless of security mode and transmitted to the computer-readable memory in only the closed mode, such that the external devices do not have access to the computer-readable memory or the another computer-readable memory in the closed mode.

12. The system of claim 11, further comprising:
a plurality of processors, wherein each security mode further corresponds to a different level of access to the plurality of processors and a different level of communications access of external devices to the transceiver compared to other respective security modes, wherein the access to the plurality of processors inversely correlates with different levels of communications access available to external devices to the transceiver such that more access to the plurality of processors is provided when less communication access with external devices is provided.

13. A system having configurable security comprising:
a plurality of electronic components, including computer-readable memory, configured to operate in at least three security modes including a closed mode, partial open mode, and open mode, each security mode corresponding to a different level of data access to the electronic components and a different level of communications access of external devices to the electronic components compared to the other security modes; and
a switch, coupled to the electronic components, having multiple switch positions corresponding to the respective security modes, wherein the data access to the electronic components inversely correlates with different levels of communications access available to external devices such that more data access to the electronic components is provided when less communication access with external devices is provided, and
another computer-readable memory separated from the computer-readable memory by a physical gap, whereby, sensitive data may be stored securely in the another computer-readable memory physically separate from the first computer-readable memory regardless of security mode and transmitted to the computer-readable memory in only the closed mode, such that the external devices do not have access to the computer-readable memory or the another computer-readable memory in the closed mode.

14. The system of claim 13, wherein the plurality of electronic components include computer-readable memory configured to store data or a plurality of processors.

15. The system of claim 14, wherein the electronic components further include a transceiver configured to provide different levels of communication access to external devices according to different security modes.

16. The system of claim 15, further comprising one or more solar panels and a rechargeable battery to provide electrical power to the plurality of electronic components.

* * * * *